(12) United States Patent
Boland

(10) Patent No.: US 8,595,890 B2
(45) Date of Patent: Dec. 3, 2013

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 614 days.

(21) Appl. No.: 12/761,637

(22) Filed: Apr. 16, 2010

(65) Prior Publication Data

US 2010/0263155 A1    Oct. 21, 2010

(51) Int. Cl.
*A47L 1/00* (2006.01)
*B60S 1/02* (2006.01)

(52) U.S. Cl.
USPC ............... 15/250.48; 15/250.361; 15/250.452

(58) Field of Classification Search
USPC ........... 15/250.201, 250.43, 250.44, 250.451, 15/250.361, 250.452, 250.38, 250.48
See application file for complete search history.

(56) References Cited

U.S. PATENT DOCUMENTS

| | | | |
|---|---|---|---|
| 3,785,002 A * | 1/1974 | Quinlan et al. ............ | 15/250.43 |
| 7,228,588 B2 * | 6/2007 | Kraemer et al. ......... | 15/250.201 |
| 7,832,047 B2 * | 11/2010 | Herinckx et al. .......... | 15/250.43 |
| 2006/0037167 A1 * | 2/2006 | Nacamuli ................ | 15/250.201 |
| 2007/0204422 A1 * | 9/2007 | Machida et al. ........... | 15/250.43 |
| 2007/0226941 A1 * | 10/2007 | Kraemer et al. ......... | 15/250.201 |
| 2008/0289134 A1 * | 11/2008 | Boussicot et al. ......... | 15/250.32 |

FOREIGN PATENT DOCUMENTS

| | | |
|---|---|---|
| DE | 10000373 A1 | 8/2001 |
| EP | 1491416 A | 12/2004 |
| FR | 2920729 A | 3/2009 |

\* cited by examiner

*Primary Examiner* — William Gilbert
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a windscreen to be wiped, which wiper blade includes a central longitudinal groove, in which groove a central longitudinal strip of the carrier element is disposed, wherein connecting pieces are provided at both ends of the wiper blade, which windscreen wiper device comprises a connecting device for an oscillating wiper arm. The wiper blade at both ends thereof extends beyond the longitudinal strip in order to define at both ends of the wiper blade a space open at one end thereof, wherein the connecting pieces are retained onto the wiper blade so as to tightly close the groove at both ends of the wiper blade against entry of dust and water.

7 Claims, 2 Drawing Sheets

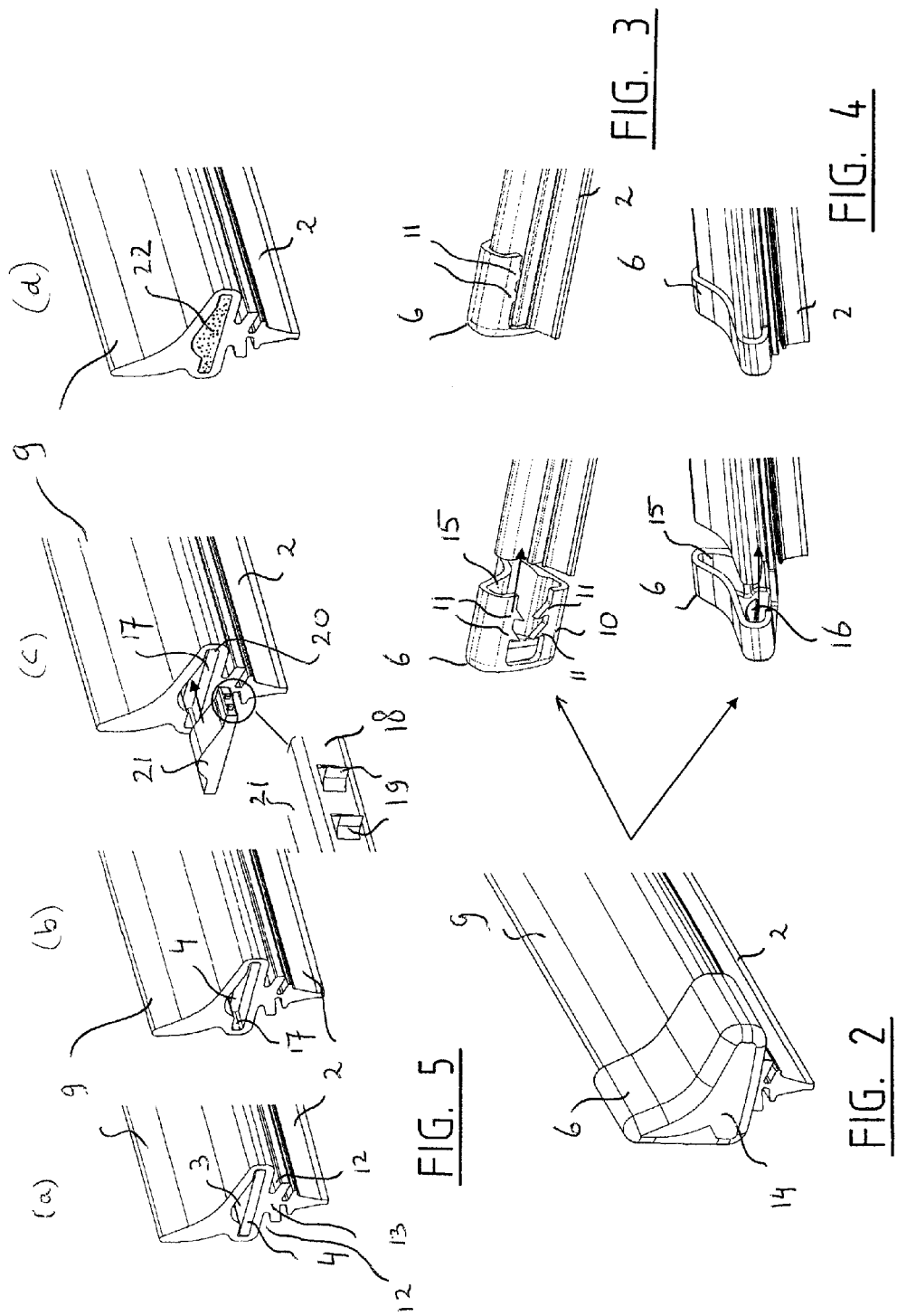

WINDSCREEN WIPER DEVICE

This application claims priority to European Application No. 09158011.8, filed Apr. 16, 2009, and is incorporated herein by reference.

BACKGROUND OF THE INVENTION

1. Technical Field

The invention relates to a windscreen wiper device comprising an elastic, elongated carrier element, as well as an elongated wiper blade of a flexible material, which can be placed in abutment with a windscreen to be wiped, which wiper blade includes a central longitudinal groove, in which groove a central longitudinal strip of the carrier element is disposed, wherein connecting pieces are provided at both ends of the wiper blade, which windscreen wiper device comprises a connecting device for an oscillating wiper arm.

2. Related Art

Such a windscreen wiper device is known from European patent publication no. 1 491 416. The prior art windscreen wiper device is in particular designed as a "yokeless" wiper device, wherein use is no longer made of several yokes pivotally connected to each other, but wherein the wiper blade is biased by the carrier element, as a result of which it exhibits a specific curvature. According to the prior art the connecting piece is slid over the neighboring ends of the strips—or vice versa, that is the neighboring ends of the strips are slid into the connecting piece—so that a reliable snap connection between these parts is realized. In the prior art the connecting piece is provided with an opening at its free end so that the wiper blade can freely slide through the connecting piece. In other words, the connecting pieces do not retain the wiper blade, so that the connecting pieces allow a relative movement of the wiper blade along the longitudinal strips in the connecting pieces.

One drawback of the prior art windscreen wiper device is the fact that the connecting pieces (in practice also called "end caps") and the wiper blade are not connected in a durable, solid manner. Particularly, when a spoiler is only retained onto the strips (and not onto an upper part of the wiper blade facing away from the windscreen to be wiped), the connecting pieces may come loose from the wiper blade. As a result, the life span of the prior art windscreen wiper device may be seriously shortened.

SUMMARY OF THE INVENTION AND ADVANTAGES

The object of the invention is to overcome this drawback of the prior art as indicated above, in particular to provide a windscreen wiper device wherein the connecting pieces ("end caps") may not come loose from the wiper blade.

In order to accomplish that objective, a windscreen wiper device of the kind referred to in the introduction is characterized according to the invention in the wiper blade at both ends thereof extends beyond the longitudinal strip in order to define at both ends of the wiper blade a space open at one end thereof, wherein the connecting pieces are retained onto the wiper blade so as to dust and water tightly close the groove at both ends of the wiper blade. In other words, the wiper blade including its central longitudinal groove is longer (has a larger length) than the longitudinal strip, wherein the central longitudinal groove with the longitudinal strip inserted therein thus defines blind holes at both ends of the wiper blade. During assembly of the present windscreen wiper device the connecting pieces and the wiper blade are interconnected in such a way that the groove is locked from the outside (i.e. the environment) in order to prevent dust and water from entering the groove from the outside.

It is noted that the present end caps avoid the risk of torsion of the rubber material of the wiper blade around the strip, particularly at the location of the free ends of the wiper blade. As the end caps close the groove in a dust tight and watertight manner, dust and (rain) water are not allowed to enter the groove. This implies that any decrease in mobility between the wiper blade and the strip due to any dust inside the groove is avoided, whereas any corrosion of the strip due to any (rain) water inside the groove is avoided as well.

In one preferred embodiment of a windscreen wiper device in accordance with the invention the connecting pieces each comprise engaging members sidewardly engaging the wiper blade from the outside, wherein the engaging members comprise retaining means for retaining the connecting pieces onto the wiper blade, and wherein the connecting pieces each comprise an interior protrusion fitting inside the space in order to dust-and-water-tightly close the groove at both ends of the wiper blade. Particularly by slidingly mounting the connecting pieces over the respective free ends of the wiper blade, the protrusions are slid in the respective blind holes of the wiper blade. The retaining means ensure that the free ends of the wiper blade will stay in the connecting pieces at all times.

In another preferred embodiment of a windscreen wiper device in accordance with the invention the retaining means engage into opposing longitudinal slits on the longitudinal sides of the wiper blade. Particularly, the retaining means comprises at least one sidewardly extending gripping tooth for gripping an intermediate web of the wiper blade as defined by the opposing longitudinal slits.

In another preferred embodiment of a windscreen wiper device according to the invention the engaging members and the retaining means are in one piece. Preferably, the engaging members and the retaining means are formed by inwardly bent parts of edges of the connecting piece. The connecting piece is particularly made in one piece of plastic.

In another preferred embodiment of a windscreen wiper device in accordance with the invention the interior protrusion extends longitudinally from an end wall of each connecting piece.

In another preferred embodiment of a windscreen wiper device according to the invention a spoiler is provided, wherein an end of the spoiler is mounted in the connecting piece. The spoiler is preferably a separate constructional element being entirely detachably connected to the wiper blade, wherein the connecting pieces can be slid over the spoiler end.

In another preferred embodiment of a windscreen wiper device in accordance with the invention the connecting pieces each comprise engaging members sidewardly engaging the wiper blade from the inside, wherein the engaging members comprise retaining means for retaining the connecting pieces onto the wiper blade. Particularly, each connecting piece is fitted inside the space in order to dust-and-water-tightly close the groove at both ends of the wiper blade, wherein each connecting piece is provided at its longitudinal sides with sidewardly extending protrusions for engaging an inner wall of the groove. More in particular, the protrusions are in the form of sharp teeth.

In another preferred variant the connecting pieces are in the form of a curable material fitting inside the space to dust and water tightly close the groove at both ends of the wiper blade.

THE DRAWINGS

The invention will now be explained in more detail with reference to figures illustrated in a drawing, wherein:

FIGS. 2 through 4 show details of the windscreen wiper device of FIG. 1; and

Figure 1:
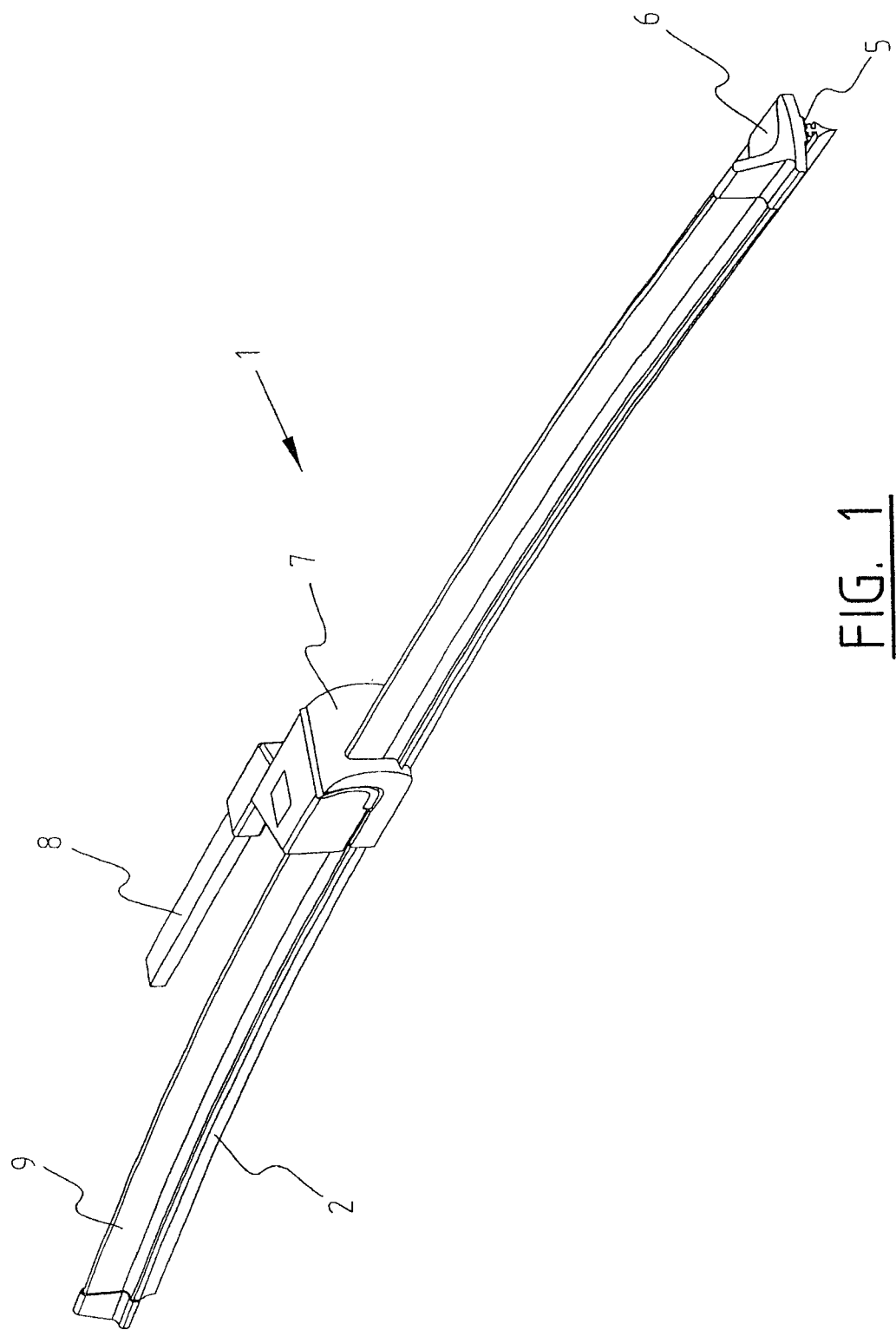
FIG. 1 is a perspective, schematic view of a preferred embodiment of a windscreen wiper device according to the invention.

FIG. 5 refers to details of the windscreen wiper device of FIG. 1 according to another preferred embodiment.

DETAILED DESCRIPTION

FIG. 1 shows a preferred variant of a windscreen wiper device 1 according to the invention. The windscreen wiper device is built up of an elastomeric wiper blade 2 having a central longitudinal groove 3. A central longitudinal strip 4 made of spring band steel is fitted in the longitudinal groove 3. The strip 4 forms a flexible carrier element for the rubber wiper blade 2, as it were, which is thus biased in a curved position (the curvature in operative position being that of a windscreen to be wiped). At both ends 5 of the wiper blade 2, that is on either side of the windscreen wiper device 1, connecting pieces 6 are povided. The windscreen wiper device 1 is further equipped with a connecting device 7 for an oscillating arm 8, and a spoiler 9.

FIG. 2 shows a free end 5 of the windscreen wiper device 1 of FIG. 1, whereas FIGS. 3 and 4 reveal a bottom and a side view of the free end, respectively, before and after mounting of the respective connecting piece 6, all seen in perspective. FIG. 5 is a perspective view of the free end 5 of FIG. 1, without the connecting piece 6 being mounted, showing stepwise the mounting of the longitudinal strip 4 inside the groove 3. Corresponding parts have been designated with the same reference numerals. The connecting pieces 6 are both made of one piece of plastic.

With reference to FIGS. 2 through 4, each connecting piece 6 is provided with two engaging members 10 made integral therewith, wherein the engaging members 10 engage around the wiper blade 2 so as to allow a slidingly mounting of the connecting pieces 6 over the ends 5 of the wiper blade 2. Further, the engaging means 10 include sidewardly extending gripping teeth 11 made integral therewith, wherein the gripping teeth 11 grip inside opposing longitudinal slits 12 and into an intermediate web 13 of the wiper blade 2. Hence, the gripping teeth 11 realize that the connecting pieces 6 are blocked against any movement in longitudinal direction with respect to the wiper blade 2. In case the gripping teeth 11 would be hook-shaped, the hooks are preferably bent in a direction away from the connecting device 7, so that any movement of the wiper blade 2 in a direction towards the connecting piece 6 is blocked by an end wall 14 of the connecting pieces 6, whereas any movement of the wiper blade 2 in a direction away from the connecting pieces 6 is blocked by the hooks. It is noted that the teeth 11 only slightly penetrate the elastomeric (rubber) material of the wiper blade 2, without damaging the same, namely a part of the wiper blade 2 that extends from the strip 4 in a direction towards the windscreen to be wiped.

Each connecting piece 6 has a cavity 15 to accomodate the free end of the wiper blade 2 with the spoiler 9, wherein reference is made to FIG. 3.

With reference to FIGS. 3 and 4, the connecting pieces 6 are each provided with a finger or protrusion 16 extending in longitudinal and inward direction from the end wall 14 thereof. When a connecting piece 6 is slidably mounted over a free end 5 of the wiper blade 2, the protrusion 16 slides inside a blind hole 17 of the wiper blade 2. As the wiper blade 2 and the groove 3 are longer than the strip 4, at both ends 5 of the wiper blade 2 the blind hole 17 (that is a space open at one end) is created.

Referring to FIG. 5 the longitudinal strip 4 is inserted inside the longitudinal groove 3 of the wiper blade 2 (FIG. 5a) until at both ends 5 of the wiper blade 2 a blind hole 17 is formed (FIG. 5b). The connecting pieces 6 in another preferred variant are now in the form of inserts 21 to be inserted inside the blind holes 17. Each insert 21 is provided at its longitudinal sides 18 with sidewardly extending protrusions 19 in the form of sharp teeth slightly penetrating, without damaging the rubber, an inner wall 20 of the groove 3 (FIG. 5c). FIG. 5d shows another preferred variant of the connecting pieces 6, namely in the form of a curable material 22 adhering to the inner wall 20 of the groove 3. The material 22 is, for example, silicone paste, which—after introduction into the blind holes 17—may cure after polymerisation.

According to the invention the connecting pieces 6 or end caps are connected to the wiper blade 2 without any connection between the connecting pieces 6 and the strip 4.

The present invention is not limited to the embodiment shown, but extends also to other embodiments falling within the scope of the appended claims.

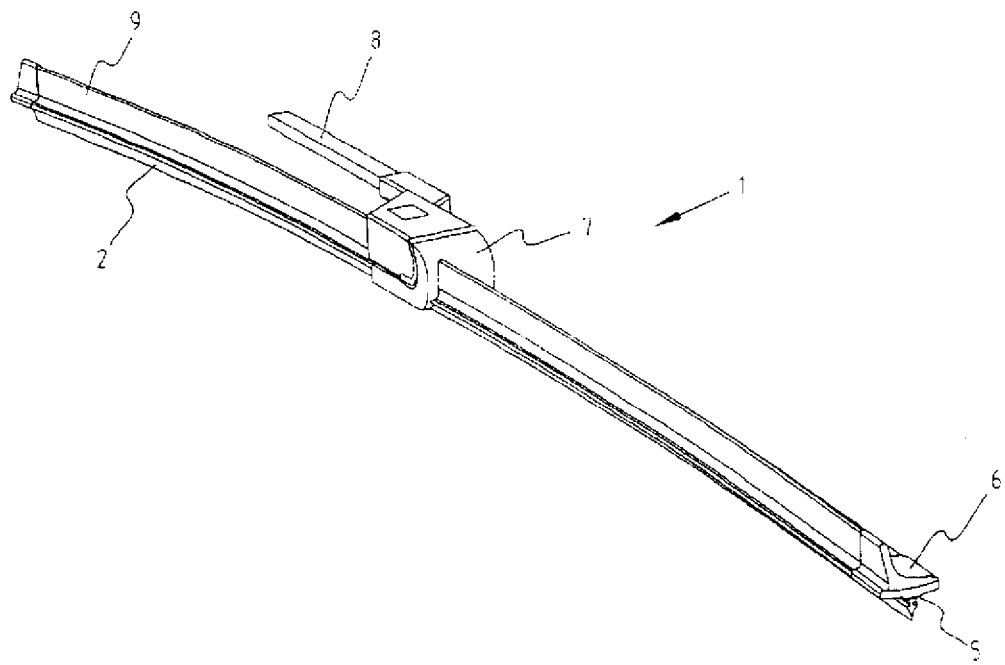

What is claimed is:

1. A windscreen wiper device comprising an elastic, elongated carrier element, as well as an elongated wiper blade of a flexible material, which can be placed in abutment with a windscreen to be wiped, which wiper blade includes a central longitudinal groove, in which groove a central longitudinal strip of the carrier element is disposed, wherein connecting pieces are provided at both ends of said wiper blade, which windscreen wiper device comprises a connecting device for connection with an oscillating wiper arm, said wiper blade at both ends thereof extends beyond said longitudinal strip in order to define at both ends of said wiper blade a space open at one end thereof, wherein said connecting pieces are retained onto said wiper blade so as to dust and water tightly close said groove at both ends of said wiper blade against entry of dust and water.

2. A windscreen wiper device according to claim 1, wherein said connecting pieces each comprise engaging members sidewardly engaging said wiper blade from the outside, wherein said engaging members comprise retaining means for retaining said connecting pieces onto said wiper blade, and wherein said connecting pieces each comprise an interior protrusion fitting inside said space in order to achieve said tight closing of said wiper blade.

3. A windscreen wiper device according to claim 2, wherein said retaining means engage into opposing longitudinal slits on said longitudinal sides of said wiper blade.

4. A windscreen wiper device according to claim 3, wherein said retaining means comprises at least one sidewardly extending gripping tooth for gripping an intermediate web of said wiper blade as defined by said opposing longitudinal slits.

5. A windscreen wiper device according to claim 4, wherein said engaging members and said retaining means are in one piece.

6. A windscreen wiper device according to claim 5, wherein said engaging members and said retaining means are formed by inwardly extending parts of edges of said connecting piece.

7. A windscreen wiper device according to claim 2, wherein said interior protrusion extends longitudinally from an end wall of each connecting piece.

\* \* \* \* \*

UNITED STATES PATENT AND TRADEMARK OFFICE
CERTIFICATE OF CORRECTION

| | | |
|---|---|---|
| PATENT NO. | : 8,595,890 B2 | Page 1 of 2 |
| APPLICATION NO. | : 12/761637 | |
| DATED | : December 3, 2013 | |
| INVENTOR(S) | : Xavier Boland | |

It is certified that error appears in the above-identified patent and that said Letters Patent is hereby corrected as shown below:

Title Page, below Abstract "7 claims, 2 Drawing sheets"—Should read—11 claims, 2 Drawing Sheets— as attached

In the Claims

Column 4, line 66 insert Claims 8, 9, 10 and 11 to read as follows:

-- 8. A windscreen wiper device according to claim 2, wherein said connecting pieces each comprise engaging members sidewardly engaging said wiper blade from the inside, wherein each of said engaging members comprises retaining means for retaining said connecting pieces onto said wiper blade.

9. A windscreen wiper device according to claim 8, wherein each connecting piece is fitted inside said space in order to tightly close said groove at both ends of said wiper blade against entry of dust and water, and wherein each connecting piece is provided at its longitudinal sides with sidewardly extending protrusions for engaging an inner wall of said groove.

10. A windscreen wiper device according to claim 9, wherein said protrusions are in the form of sharp teeth.

11. A windscreen wiper device according to claim 1, wherein the connecting pieces are in the form of a curable material fitting inside said space to tightly close said groove at both ends of said wiper blade against entry of dust and water. --

Signed and Sealed this
Twenty-ninth Day of April, 2014

Michelle K. Lee
*Deputy Director of the United States Patent and Trademark Office*

(12) United States Patent
Boland

(10) Patent No.: US 8,595,890 B2
(45) Date of Patent: Dec. 3, 2013

(54) WINDSCREEN WIPER DEVICE

(75) Inventor: Xavier Boland, Arlon (BE)

(73) Assignee: Federal-Mogul S.A., Aubange (BE)

(*) Notice: Subject to any disclaimer, the term of this patent is extended or adjusted under 35 U.S.C. 154(b) by 614 days.

(21) Appl. No.: 12/761,637

(22) Filed: Apr. 16, 2010

(65) Prior Publication Data
US 2010/0263155 A1    Oct. 21, 2010

(51) Int. Cl.
*A47L 1/00* (2006.01)
*B60S 1/02* (2006.01)

(52) U.S. Cl.
USPC ............. 15/250.48; 15/250.361; 15/250.452

(58) Field of Classification Search
USPC ........... 15/250.201, 250.43, 250.44, 250.451, 15/250.361, 250.452, 250.38, 250.48
See application file for complete search history.

(56) References Cited

U.S. PATENT DOCUMENTS

| | | | |
|---|---|---|---|
| 3,785,002 A * | 1/1974 | Quinlan et al. | 15/250.43 |
| 7,228,588 B2 * | 6/2007 | Kraemer et al. | 15/250.201 |
| 7,832,047 B2 * | 11/2010 | Herinckx et al. | 15/250.43 |
| 2006/0037167 A1 * | 2/2006 | Nacamuli | 15/250.201 |
| 2007/0204422 A1 * | 9/2007 | Machida et al. | 15/250.43 |
| 2007/0226941 A1 * | 10/2007 | Kraemer et al. | 15/250.201 |
| 2008/0289134 A1 * | 11/2008 | Boussicot et al. | 15/250.32 |

FOREIGN PATENT DOCUMENTS

| | | |
|---|---|---|
| DE | 10000373 A1 | 8/2001 |
| EP | 1491416 A | 12/2004 |
| FR | 2920729 A | 3/2009 |

* cited by examiner

*Primary Examiner* — William Gilbert
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a windscreen to be wiped, which wiper blade includes a central longitudinal groove, in which groove a central longitudinal strip of the carrier element is disposed, wherein connecting pieces are provided at both ends of the wiper blade, which windscreen wiper device comprises a connecting device for an oscillating wiper arm. The wiper blade at both ends thereof extends beyond the longitudinal strip in order to define at both ends of the wiper blade a space open at one end thereof, wherein the connecting pieces are retained onto the wiper blade so as to tightly close the groove at both ends of the wiper blade against entry of dust and water.

11 Claims, 2 Drawing Sheets